United States Patent
Keller et al.

(10) Patent No.: US 10,599,217 B1
(45) Date of Patent: Mar. 24, 2020

(54) KINEMATIC MODEL FOR HAND POSITION

(71) Applicant: Facebook Technologies, LLC, Menlo Park, CA (US)

(72) Inventors: Sean Jason Keller, Kirkland, WA (US); Tristan Thomas Trutna, Seattle, WA (US); David R. Perek, Bellevue, WA (US); Bruce A. Cleary, III, Seattle, WA (US); Brian Michael Scally, Seattle, WA (US); Raymond King, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/713,917

(22) Filed: Sep. 25, 2017

Related U.S. Application Data

(60) Provisional application No. 62/399,958, filed on Sep. 26, 2016.

(51) Int. Cl.
| | |
|---|---|
| *G06F 3/01* | (2006.01) |
| *A41D 19/00* | (2006.01) |
| *G06T 19/00* | (2011.01) |
| *G01L 1/04* | (2006.01) |

(52) U.S. Cl.
CPC ......... *G06F 3/014* (2013.01); *A41D 19/0027* (2013.01); *G01L 1/04* (2013.01); *G06T 19/003* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 4,444,205 A | * | 4/1984 | Jackson | A61B 5/1106 338/114 |
| 4,715,235 A | * | 12/1987 | Fukui | G01D 5/16 338/114 |
| 5,086,785 A | * | 2/1992 | Gentile | A61B 5/1126 338/210 |
| 5,280,265 A | * | 1/1994 | Kramer | A61B 5/6806 128/925 |
| 5,316,017 A | * | 5/1994 | Edwards | G06F 3/014 600/595 |
| 5,676,157 A | * | 10/1997 | Kramer | A61B 5/103 600/595 |
| 5,913,820 A | * | 6/1999 | Bladen | A61B 5/06 128/899 |
| 6,050,962 A | * | 4/2000 | Kramer | A61B 5/1071 600/595 |
| 6,073,043 A | * | 6/2000 | Schneider | A61B 5/06 128/899 |

(Continued)

*Primary Examiner* — Chad M Dicke
(74) *Attorney, Agent, or Firm* — Fenwick & West LLP

(57) ABSTRACT

A wearable device to be worn on a body part includes deformation sensors and a controller. The controller instructs the deformation sensors to measure deformation forces. The controller determines a position of the body part based on the measured deformation forces and a transfer function that maps deformation forces to positions of a same or corresponding body part. The transfer function is generated based on measurements from calibration and deformation sensors to sense corresponding positions of the body part and deformation forces. A calibration sensor may include a magnetic field generator and a magnetic flux sensor. The wearable device may be a glove and the body part may be a hand.

21 Claims, 7 Drawing Sheets

(56) References Cited

U.S. PATENT DOCUMENTS

| | | | |
|---|---|---|---|
| 6,374,134 B1 * | 4/2002 | Bladen | A61B 5/06 324/207.13 |
| 6,789,043 B1 | 9/2004 | Nelson et al. | |
| 6,924,787 B2 * | 8/2005 | Kramer | G06F 3/016 345/156 |
| 7,373,721 B2 * | 5/2008 | Bergamasco | A61B 5/1071 33/1 N |
| 8,421,448 B1 | 4/2013 | Tran et al. | |
| 9,582,072 B2 * | 2/2017 | Connor | G06F 3/011 |
| 2001/0020140 A1 * | 9/2001 | Kramer | A61B 5/1071 600/595 |
| 2004/0174337 A1 * | 9/2004 | Kubota | G06F 3/014 345/156 |
| 2007/0167722 A1 * | 7/2007 | Bladen | A61B 5/06 600/407 |
| 2012/0157263 A1 * | 6/2012 | Sivak | G06F 3/014 482/4 |
| 2014/0012157 A1 * | 1/2014 | Gilhuly | G05B 17/02 600/554 |
| 2014/0085177 A1 | 3/2014 | Lyons et al. | |
| 2014/0368445 A1 * | 12/2014 | Feng | G06F 3/016 345/173 |
| 2016/0054798 A1 * | 2/2016 | Messingher | G06F 3/012 345/156 |
| 2016/0058613 A1 * | 3/2016 | Palazzolo | A61N 2/006 607/105 |
| 2016/0059412 A1 * | 3/2016 | Oleynik | B25J 9/163 700/257 |
| 2016/0070347 A1 * | 3/2016 | McMillen | H03K 17/964 345/173 |
| 2016/0246369 A1 * | 8/2016 | Osman | A63F 13/212 |
| 2016/0335486 A1 * | 11/2016 | Fleishman | G06K 9/00355 |
| 2016/0338644 A1 * | 11/2016 | Connor | G06F 3/014 |
| 2017/0156662 A1 * | 6/2017 | Goodall | A61B 5/4836 |
| 2017/0205880 A1 * | 7/2017 | Osman | A63F 13/212 |
| 2017/0292712 A1 * | 10/2017 | Alexander | F24C 7/086 |

* cited by examiner

600

---

Calibration Phase

Concurrently activate calibration sensors and deformation sensors and measure corresponding positions and deformations
610

↓

Generate kinematic model (transfer function) mapping the positions and deformations
620

↓

Generate an inverse kinematic model by inverting the transfer function
630

---

Run-time

Deactivate calibration sensors and activate deformation sensors.
640

↓

Measure deformation signals from the deformation sensors
650

↓

Compute positions (and optionally orientations) by applying the inverse kinematic model to the measured deformation signals
660

FIG. 6

KINEMATIC MODEL FOR HAND POSITION

CROSS REFERENCE TO RELATED APPLICATION

This application claims the benefit of U.S. Provisional Application No. 62/399,958 filed Sep. 26, 2016, which is incorporated by reference in its entirety.

BACKGROUND

The present disclosure generally relates to a wearable device for use in a virtual, augmented, or mixed reality (VR, AR, or MR) system, and more specifically relates to determining positions of a body part that the wearable device is worn on.

VR is a simulated environment created by computer technology and presented to a user, such as through a system. Similarly, AR or MR combine a computer-simulated environment with reality for presentation to a use through an AR/MR system. Typically, a VR/AR/MR system includes a headset that provides visual and audio information to the user. However, when wearing the headset, the user is unable to see the user's hands or interact with the simulated environment presented by the headset with the user's hands. Conventional systems create virtual hands in the simulated environment and use a hand tracking system to track motion and positions of the user's hands. However conventional hand tracking systems are often unable to accurately track positions of the user's fingers and thumbs, and thus are unable to track the precise movements of the user's digits and hand through space and time, causing poor representation of movement of the user's hand by virtual hands of the user within the simulated environment.

SUMMARY

A wearable device (such as a glove or other control adapted to be worn on a portion of a body) includes a sensing apparatus that determines spatial orientations/positions of points on the wearable device based on a pre-calibrated transfer function (or kinematic model) that maps deformation forces sensed in response to hand movement as a function of positions of various parts of the hand in response to the hand movement. In some embodiments, the forces or deformations are monitored or measured at run-time and the pre-calibrated transfer function is inverted to determine hand positions.

In some embodiments, a set of calibration sensors are used to sense hand positions during the calibration stage, concurrently with the deformations to generate the transfer function (or kinematic model). These calibration sensors could include inertial sensors, such as accelerometers and gyroscopes, arrays of magnetic sensors, and generators. In some embodiments, the calibration sensor comprises an array of magnetic generators being tracked by an array of magnetic sensors with known or solvable positions. Alternatively, the calibration sensors comprise an array of magnetic sensors being tracked by an array of magnetic generators with known or solvable positions.

In addition, the forces or deformations may be monitored or measured (during calibration and at run-time) by one or more deformation sensors (such as a strain gauge, force sensor, wave propagation based deformation sensor, birefringence based deformation sensor, electrochemical sensors, and the like). In some embodiments, the deformation sensors passively measure a deformation of portions of the hand without any external stimulus being applied to the hand. Alternatively, the deformation sensors operate in conjunction with stimulators (such as ultrasonic, electrical, or other stimulators) that perturbs and stimulates a body part in a vicinity of the deformation sensor and the deformation sensor measures a response of the body part due to the applied stimulus.

As one example, a glove (or other control adapted to be worn on a portion of a body) includes a number of actuators (e.g., ultrasound stimulators) that simulate the tendons of the human hand and a number of sensors (e.g., strain sensors) that sense responses to the applied stimulation. When the glove is manipulated, the resulting strains or other measures of the sensors are used as a proxy for the forces on the tendons of the hand. A reverse kinematic model (inverse transfer function) maps the forces on the tendons of a hand to positions of parts of the hand, and the reverse kinematic model (inverse transfer function) is used to determine the position of the glove (or parts of the glove) as a function of the measures (e.g., strains) of the sensors.

These approaches can be used to ascertain lateral angular (e.g., planar) separations between fingers, transverse angular (e.g., oblique) separations between fingers, bend angles of a finger, or other suitable orientations and positions of a body part (such as a hand). In some embodiments, the orientations and/or positions of points on the wearable device (such as a glove) worn around a body part (e.g., fingers of a hand) are used to determine a state of the body part. For example, the orientations and/or positions of points on a glove (or other wearable device) are used to provide information about or to render a state of the hand (or other body part) in a VR (virtual reality) environment or VR world. For example, states of a hand (e.g., open, closed, pointing, gesturing, etc.) can be determined based on the bend angles of fingers or finger tips corresponding to the positions or orientations of points on the glove.

In one embodiment, a wearable device to be worn on a body part includes a deformation sensors and a controller. The deformation sensors are coupled to a deformable material that is to be worn on a body part of a user. The controller instructs the deformation sensors to measure deformation forces. The controller determines a position of the body part based on the measured deformation forces and a transfer function that maps sensed deformation forces to positions of a same or corresponding body part. The transfer function may be generated based on measurements from calibration sensors and the deformation sensors to sense corresponding positions of the body part and deformation forces.

In one embodiment, a method includes activating deformation sensors. Deformation signals are measured from the deformation sensors. And positions of the body part are computed by applying an inverse kinematic model to the measured deformation signals. The method includes concurrently activating calibration sensors and the deformation sensors to measure corresponding positions of a same or corresponding body part and deformations signals. A kinematic model is generated that maps positions of the same or corresponding body part and deformation signals. And the inverse kinematic model is generated by inverting the kinematic model.

BRIEF DESCRIPTION OF THE DRAWINGS

FIG. 6 is a flow chart for an example process for operating the position and orientation sensing system on a wearable device based on pre-calibrated kinematic model, in accordance with one or more embodiments.

DETAILED DESCRIPTION

Figure 1A:
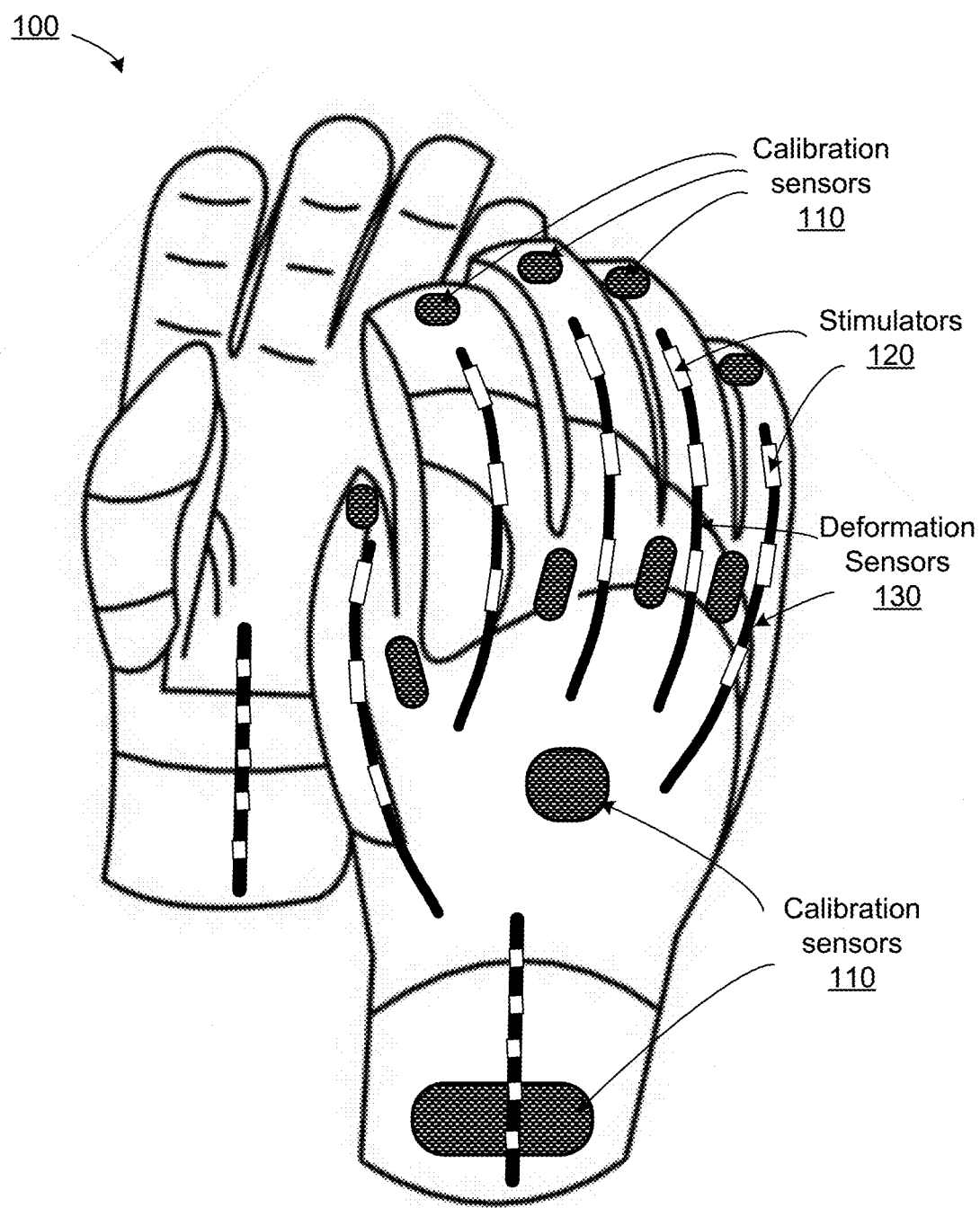
FIG. 1A illustrates a wearable device that determines spatial orientations/positions of points on the wearable device based on a pre-calibrated kinematic model (transfer function) between positions and deformations, in accordance with an embodiment.

FIG. 1A illustrates a wearable device 100 that determines spatial orientations/positions of points on the wearable device 100 based on a pre-calibrated kinematic model (transfer function) between positions and deformations. In this embodiment the wearable device 100 is a glove. In other embodiments, the wearable device can include other wearable items. For example, the wearable device may be a wearable headset to be worn over a portion of the face. The wearable device may be a cover, thimble, or guard band to be worn over a finger or wrist. The wearable device may be a brace to be worn over a knee, elbow, ankle, or shoulder joint. The wearable device may be a support brace to be worn over a neck or torso part such as a chest, back or waist.

In some embodiments, a set of calibration sensors 110 can be used to sense hand positions during the pre-calibration stage. Concurrently, while the calibration sensors 110 measure these hand positions, deformation sensors 130 measure deformations (stretch, flex, forces, etc.) of various portions of the hand. A transfer function (or kinematic model) can thus be generated, during the calibration phase, which maps the positions with the concurrently measured deformations. In some embodiments, a transfer function from hand positions angles to measure deformations is a sparse matrix of moment arm functions based on the size of a user's hand.

And measured deformation may be found by multiplying a moment arm function matrix with all of the hand angles.

Deformation sensors could include strain gauges, force sensors, wave propagation based deformation sensors, birefringence based deformation sensors, electrochemical sensors, and the like. Calibration sensors 110 could include inertial sensors such as accelerometers and gyroscopes, arrays of magnetic sensors and generators, or any other suitable position/orientation sensors.

In some embodiments, the deformation sensors 130 operate in conjunction with stimulators 120 (such as ultrasonic, electrical, or other stimulator) that perturb and stimulate a body part in a vicinity of the deformation sensor 130. The deformation sensors 130 measure a response of the body part due to the applied stimulus.

At run-time, forces or deformations can be monitored or measured (during calibration and at run-time) by the one or more deformation sensors 130. In some embodiments, the deformation sensors passively measure a deformation of portions of the hand without any external stimulus being applied to the hand. Alternatively, the deformation sensors operate in conjunction with stimulators (such as ultrasonic, electrical, or other stimulator) that perturbs and stimulates a body part in a vicinity of the deformation sensor and the deformation sensor measures a response of the body part due to the applied stimulus.

Figure 1C:
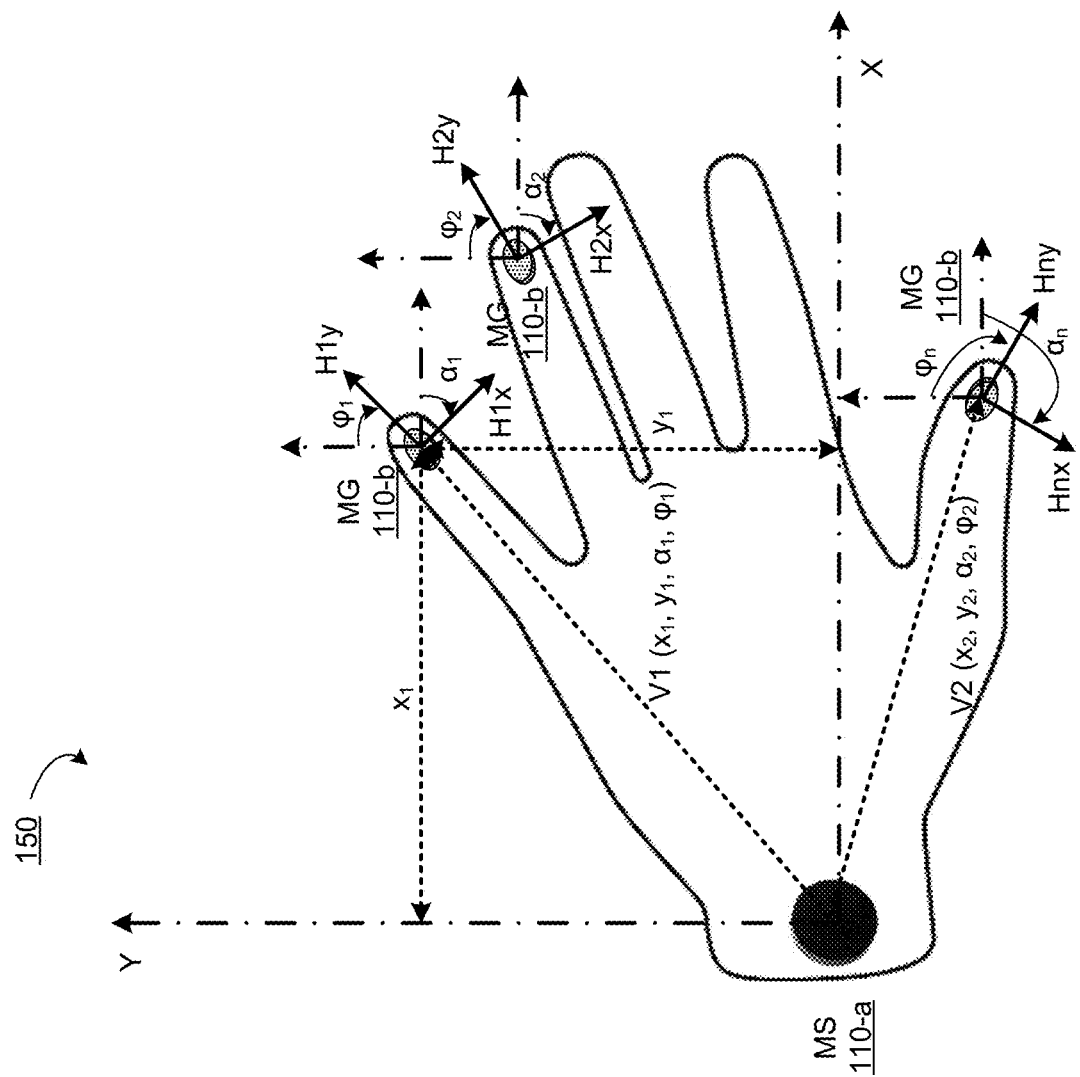
FIG. 1C illustrates a two-dimensional framework for determining spatial position vectors in two-dimensional Cartesian space for a configuration with a single magnetic flux sensor and multiple magnetic generators, in accordance with one or more embodiments.
Figure 1B:
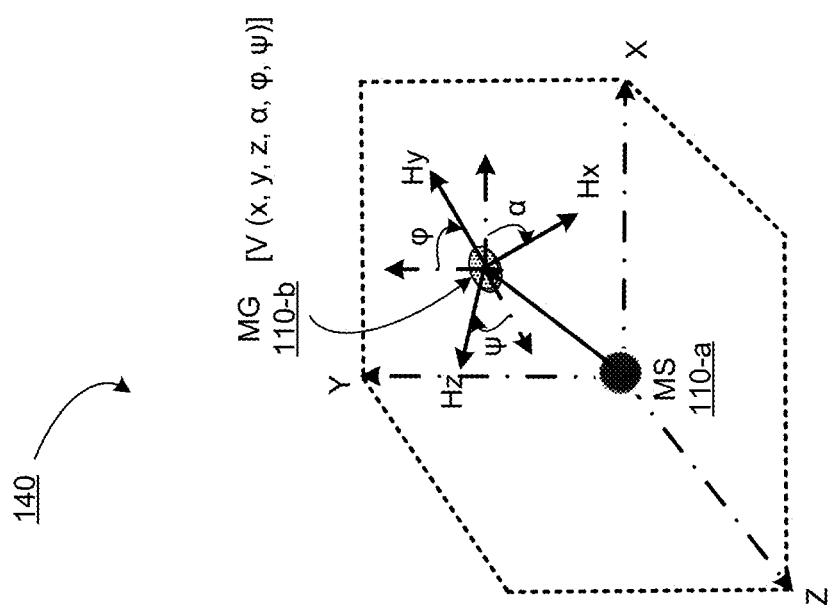
FIG. 1B illustrates an example of a three-dimensional framework for determining spatial position vectors in three-dimensional Cartesian space using magnetic flux sensor and magnetic generator, in accordance with one or more embodiments.

FIGS. 1B and 1C illustrate example frameworks within which spatial positions are determined during a calibration phase of the kinematic model (transfer function), in accordance with one or more embodiments.

In some embodiments, the calibration sensors 110 comprise an array of magnetic generators (MG) 110-$b$ being tracked by an array of magnetic sensors (MS) 110-$a$ having known or solvable positions. Alternatively, the calibration sensors 110 comprise an array of magnetic sensors 110-$a$ being tracked by an array of magnetic generators 110-$b$ with known or solvable positions.

FIG. 1B illustrates an example of a three-dimensional framework 140 for determining spatial position vectors in three-dimensional Cartesian space using magnetic flux sensor 110-$a$ and magnetic generator 110-$b$.

In one or embodiments, a spatial position is expressed as a vector with multiple components representing spatial coordinates (positions and/or orientations) in a multi-dimensional space. For example, in a three-dimensional coordinate system, the vector components of a spatial position vector include Cartesian distances along three orthogonal Cartesian coordinate axes (X, Y, Z) and/or angular orientation (angles $\alpha$, $\varphi$, $\psi$) defined with respect to three mutually perpendicular Cartesian axes (X, Y, Z) or mutually perpendicular Cartesian planes (YZ, XZ, and XY). In some embodiments, the spatial position vectors may include Cartesian distances along three orthogonal Cartesian coordinate axes (X, Y, Z), but not the angular orientations (angles $\alpha$, $\varphi$, $\psi$).

In one or more embodiments, each magnetic field generator (MG) 110-$b$ includes one or more magnets. Each magnet of a given magnetic generator (MG 110-$b$) may be configured to generate a corresponding magnetic field oriented along a distinct direction (e.g., a distinct coordinate axis) from other magnets of that magnetic generator. In some embodiments, a magnetic field generator includes three magnets, the three magnets generating three orthogonal magnetic fields along three orthogonal Cartesian coordinate axes (Hx, Hy, and Hz, as illustrated for MG 110-$b$ in FIG. 1B).

Similarly, each magnetic flux sensor (MS 110-$a$) includes one or more constituent sensing elements (e.g., one or more magnetometers), each sensing element (magnetometer) configured to generate a signal responsive to a detected magnetic field that is oriented along a distinct direction (e.g., a distinct coordinate axis). For example, a magnetic flux sensor (e.g., MS 110-a of FIG. 1B) includes three sensing elements (such as hall-effect sensors) configured to generate (output) corresponding signals (e.g., current outputs) that are proportional to and responsive to magnetic fields along the three different orthogonal axes (X, Y, and Z) of a three dimensional spatial coordinate system.

In such embodiments, a spatial position vector (e.g., vector V, as illustrated in FIG. 1B) may be defined for each MG-MS pair, to represent Cartesian distances along three orthogonal Cartesian coordinate axes (X, Y, Z) between the MG and MS. The spatial position vector may also include angular orientations represented as angles ($\alpha$, $\varphi$, $\psi$) between the magnetic field axes of the MG (e.g., Hx, Hy, and Hz) and the sensing axes of the MS (e.g., X, Y, and Z). The angles may alternatively be computed with respect to the three mutually perpendicular Cartesian planes (YZ, XZ, and XY) that are defined either for the MS or the MG.

FIG. 1C illustrates a two-dimensional framework 150 for determining spatial position vectors in two-dimensional Cartesian space for a configuration with a single magnetic flux sensor MS 110-a and multiple magnetic generators (including MG 110-b).

In some embodiments, the magnetic fields (H1x, H1y; H2x, H2y; Hnx, Hny) from the different magnetic generators (MG 110-b) are uniquely distinguished in order for the magnetic flux sensor (MS 110-a) to be able to discriminate signals from each of the magnetic generators MG 110-b. This allows separate determination of positions of these magnetic generators MG 110-b. For example, the magnetic fields generated by each of the MG can be distinguished from magnetic fields generated by other MGs by controlling one or more of the AC characteristics of the field. For example, each MG can be driven at a different frequency (e.g., frequency division multiplexing) for disambiguation from other electromagnets. Alternatively, each MG can be driven at a different instance in time (e.g., time division multiplexing) for disambiguation from (and interoperability with) other MGs or undesired interference in the form of ambient or external magnetic flux.

In some embodiments, a magnetic field generator includes one or more electromagnets that can be independently driven to result in the creation of a three dimensional magnetic field with known AC characteristics and geometry. In such embodiments, the magnetic fields generated by each of the electromagnets can be distinguished from magnetic fields generated by other electromagnets by controlling one or more of the AC characteristics of the field. For example, each electromagnet can be driven at a different frequency (e.g., frequency division multiplexing) for disambiguation from other electromagnets. Alternatively, each electromagnet can be driven at a different instance in time (e.g., time division multiplexing) for disambiguation from (and interoperability with) other electromagnets or undesired interference in the form of ambient or external magnetic flux.

As illustrated in FIG. 1C for the first magnetic field generator MG 110-b with reference to the magnetic flux sensor MS 110-a, a spatial position vector (V1) including the Cartesian distances ($x_1$, $y_1$) and angular orientations ($\alpha_1$, $\varphi_1$), can be computed based on the signals detected by the MS 110 responsive to the magnetic fields (H1x and H2x) generated by MG 110-b.

Similarly, as illustrated in FIG. 1B, a spatial position vector (V) including the Cartesian distances (x, y, z) and angular orientations ($\alpha$, $\varphi$, $\psi$), can be computed based on the signals detected by a MS 110-a responsive to the magnetic fields (Hx, Hy, and Hz) generated by MG 110-b in a three-dimensional Cartesian space.

In some embodiments, in a three-dimensional coordinate system, the spatial ambiguity in positions in the three-dimensional sensor space can resolved by performing two-dimensional projections from the three-dimensional space to a two-dimensional magnetic field space. This two-dimensional projection involves three unknown rotation angles and can be mathematically indicated as below:

$$T_{R,P,Y}H = T_{R,P,Y}\begin{pmatrix} H_x \\ H_y \\ H_z \end{pmatrix} = \begin{pmatrix} H_r \\ H_\theta \\ 0 \end{pmatrix} = \begin{pmatrix} M\cos\theta/2\pi r^3 \\ M\sin\theta/4\pi r^3 \\ 0 \end{pmatrix} \quad (1)$$

where H is the sensor vector and $T_{R,P,Y}$ is a rotation matrix with three unknown variables R (Roll), P (Pitch) and Y (Yaw) corresponding to angular orientations ($\alpha$, $\varphi$, $\psi$), to project the three-dimensional sensor space to the two-dimensional magnetic-field space. Since equation (1) is an under-constrained system; the system needs to be solved for five unknown variables (R, P, Y, r, $\theta$) from three equations ($H_x$, $H_y$, $H_z$). These unknown angles (e.g., R, P, Y) are solved, in some embodiments, using a searching process that determines a global optimal solution. Any global search optimization algorithm may be acceptable as a searching process that determines a global optimal solution. Examples include, any global search gradient decent, generalized pattern search, or mesh adaptive search algorithm.

Figure 2:
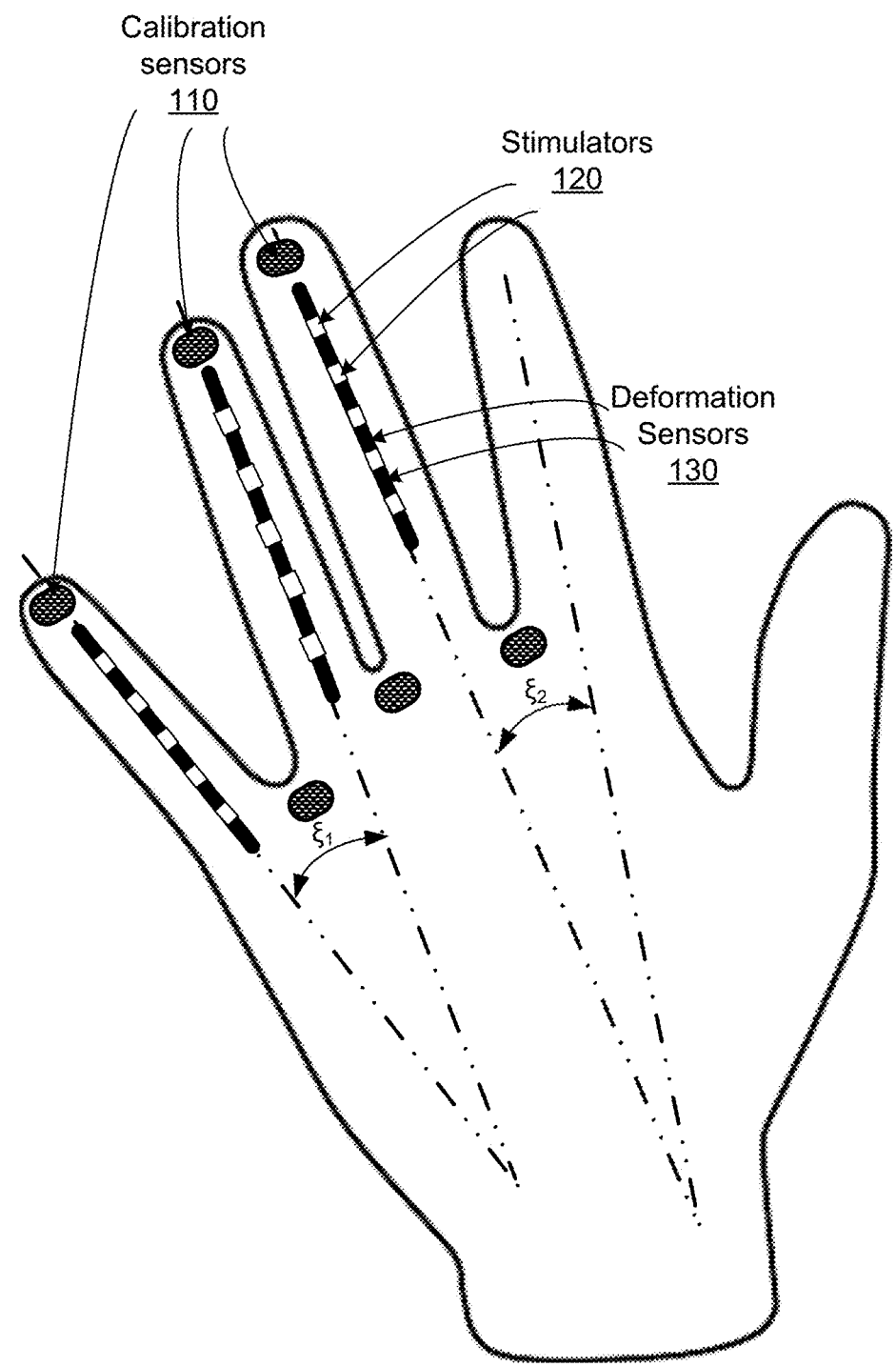
FIG. 2 illustrate use of the inverse kinematic model for determine a lateral angular (e.g., planar) separation between two fingers, in accordance with one or more embodiments.
Figure 3:
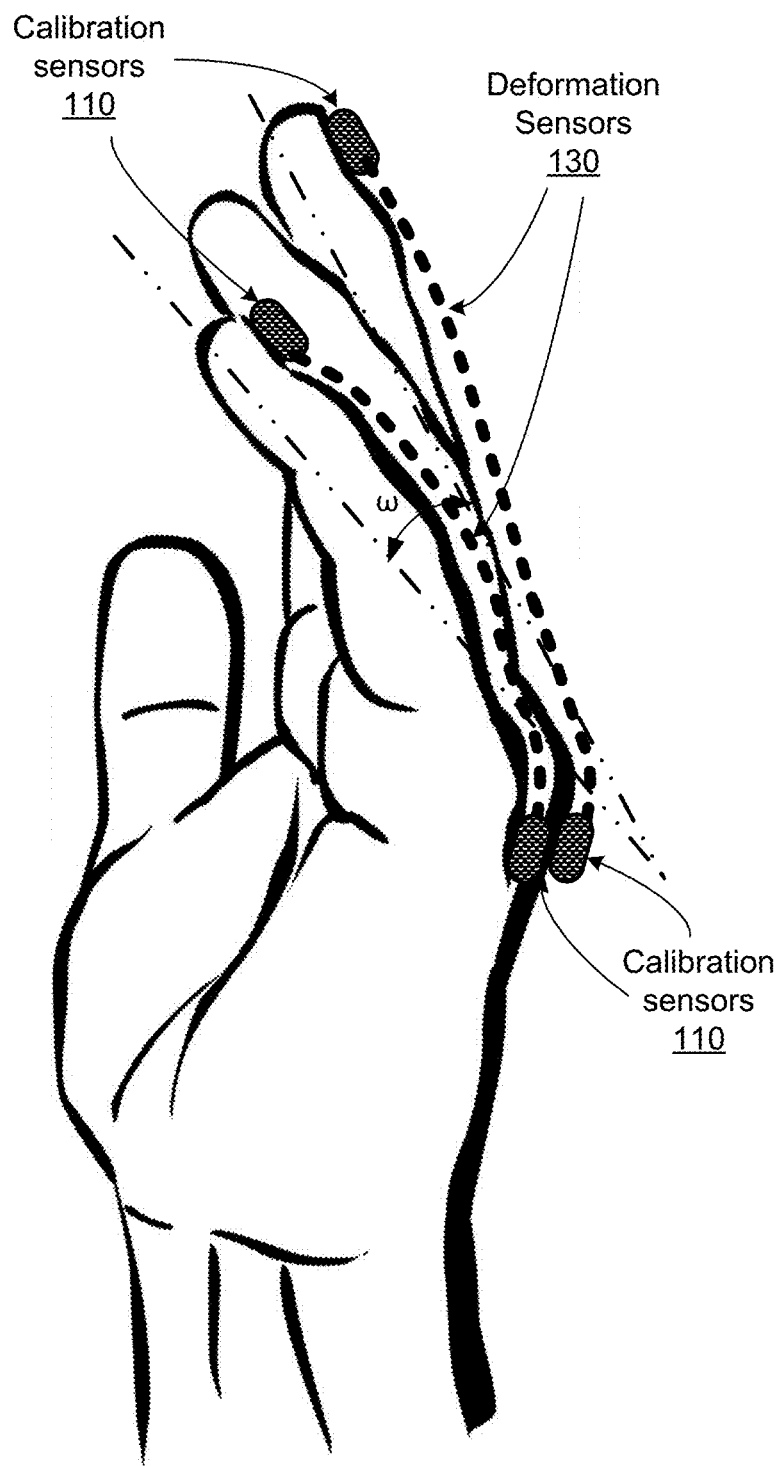
FIG. 3 illustrates use of the inverse kinematic model for determine a transverse angular (e.g., oblique) separation between the two fingers, in accordance with one or more embodiments.
Figures 4A, 4B, 4C, 4D:
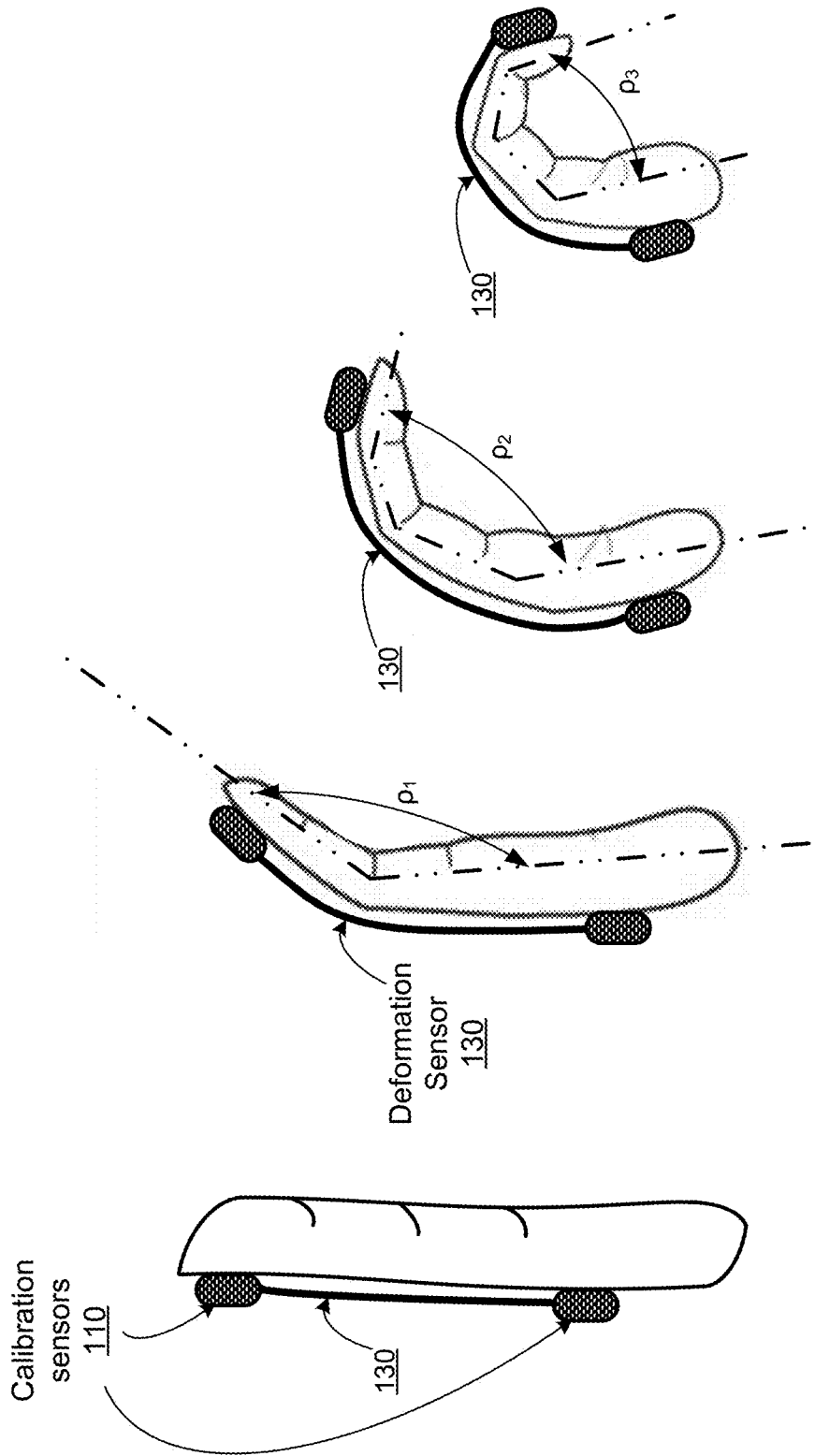
FIG. 4A illustrates use of the inverse kinematic model to determine bend angles of the finger, in accordance with one or more embodiments.
FIG. 4B illustrates use of the inverse kinematic model to determine bend angles of the finger, in accordance with one or more embodiments.
FIG. 4C illustrates use of the inverse kinematic model to determine bend angles of the finger, in accordance with one or more embodiments.
FIG. 4D illustrates use of the inverse kinematic model to determine bend angles of the finger, in accordance with one or more embodiments.

FIG. 2 illustrate use of the inverse kinematic model for determine a lateral angular (e.g., planar) separation between two fingers, in accordance with one or more embodiments. FIG. 3 illustrates use of the inverse kinematic model for determine a transverse angular (e.g., oblique) separation between the two fingers, in accordance with one or more embodiments. FIGS. 4A-4D illustrate use of the inverse kinematic model for determine bend angles of the finger, in accordance with one or more embodiments.

Pre-calibration measurements of positions from the calibration sensors 110 can be mapped to the deformations measured by the deformation sensors 130 during pre-calibration phase. During run-time, when the hand undergoes movement (as illustrated in FIG. 2 or 3), the deformation sensors 130 sense corresponding deformation (either passively, or in response to applied stimulation by stimulators 120). The calibration sensors 110 can be turned off during run-time and the positions of the fingers can be determined by applying an inverse of the pre-calibrated transfer function to the deformations measured at run-time to compute the position measures (without the use of any position sensors during run-time).

At run time, using the computed positions obtained via the inverse kinematic model as applied to the measured deformations, various hand orientations can be determined, such as lateral angular separation (e.g., planar angle $\xi_1$ or $\xi_2$) between two fingers as illustrated in FIG. 2, a transverse angular separation (e.g., oblique angle $\omega$) between two fingers, as illustrated in FIG. 3, or bend angles ($\rho_1$, $\rho_2$, $\rho_3$) as illustrated in FIGS. 4A-4D. The orientations of the segments of the hand may be determined by finding the inverse kinematic model through algebraic, Jacobian based, or optimization based methods. Using the inverse kinematics solution, three dimensional (3D) line equations can be derived from the orientation of the segments of the hand. If and where the 3D line equations intersect, the angle between the intersecting 3D lines may be determined using linear algebra techniques. Accordingly, lateral angular separation (e.g., planar angle $\xi_1$ or $\xi_2$), transverse angular separation (e.g., oblique angle $\omega$), and bend angles ($\rho_1$, $\rho_2$, $\rho_3$) base on the positions can be computed from using the inverse kinematic model and linear algebra techniques.

Figure 5:
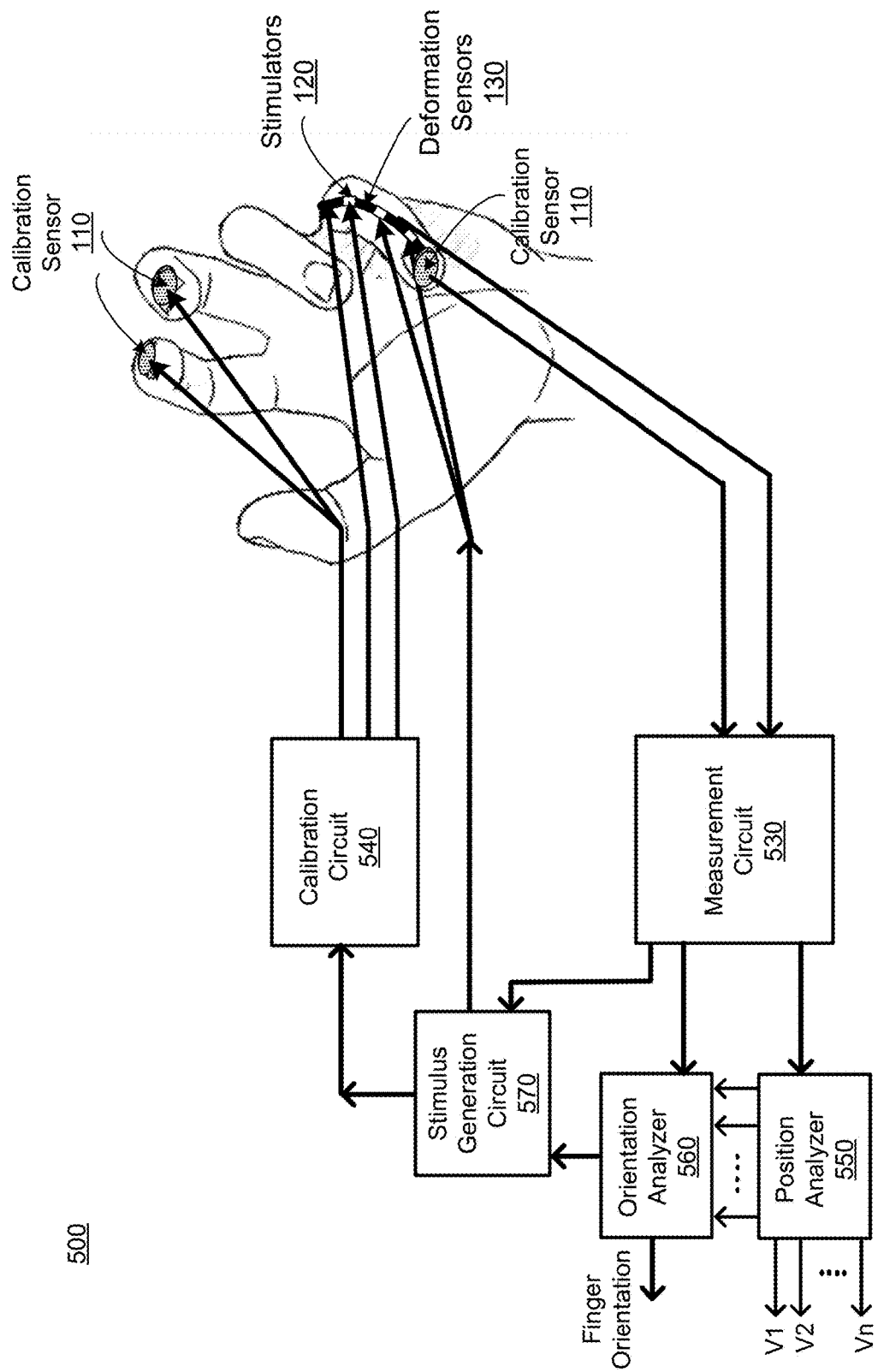
FIG. 5 illustrates a system for position and location sensing based on a pre-calibrated kinematic model, in accordance with one or more embodiments.

FIG. 5 illustrates a system 500 for position and location sensing based on a pre-calibrated kinematic model, according to one or more embodiments.

The system 500 includes one or more calibration sensors 110 (including the magnetic flux sensor(s) MS 110-a) as well as one or more magnetic field generators (including MG 110-b) as described with reference to FIGS. 1-4. In one or more embodiments, system 500 also includes a calibration circuit 540 for providing, during a calibration phase, bias signals (such as power and other operating signals) and driving signals (such as stimulating/driving currents and voltages) to the calibration sensors 110, deformation sensors 130, and to the stimulators 120. The calibration circuit may turn off the calibration sensors 110 during run-time, by providing bias and driving signals to deformation sensors 130 and stimulators 120, but not to the calibration sensors 110.

The measurement circuit 530 measures, during the calibration phase, deformation signals sensed by the deformation sensors 130 and position signals sensed by the calibration sensors and optionally generates a kinematic model (transfer function) mapping the measured positions and the measured deformations. The measurement circuit 530 measures, during run-time, deformation signals sensed by the deformation sensors 130 and provides these measured deformation signals to the position analyzer 550.

The position analyzer 550 stores the kinematic model or an inverse of the kinematic model generated during the calibration phase. At run time, the position analyzer 550 receives the measured deformation signals from the measurement circuit 530 and applies the inverse kinematic model to the measured deformations to compute the spatial positions (e.g., vectors V1, V2, Vn, and the like), corresponding to the measured deformations.

The orientation analyzer 560 determines a finger orientation (e.g., oblique angles, planar angles, bend angles as described with reference to FIGS. 2-4) based on the signals measured from the deformation sensors 130 and, optionally, the spatial positions (e.g., vectors V1, V2, Vn, and the like).

In one or more embodiments, system 500 also includes a stimulus generation circuit 570 which generates signals to modify biasing and driving properties of the calibration sensors 110 and/or deformation sensors 130 based on the measured or detected signals. The stimulus generation circuit 570 may receive signals from the Orientation and Position analyzers 560 and 550, or from the measurement circuit 530 and modify properties of the sensors and stimulators (during calibration phase or at run-time) based on the received signals.

In one embodiment, the measurement circuit 530 and the position analyzer 550 may be referred to as a controller. The controller may optionally include one or more of the calibration circuit 540, the stimulus generation circuit 570, the orientation analyzer 560, and the position analyzer 550.

FIG. 6 a flow chart for an example process 600 for operating the position and orientation sensing system on a wearable device based on pre-calibrated kinematic model, according to one or more embodiment. The process 600 of FIG. 6 may be performed by a system 500 for position and location sensing. Other entities (e.g., wearable device) may perform some or all of the steps of the process in other embodiments. Likewise, embodiments may include different and/or additional steps, or perform the steps in different orders.

During a calibration phase, calibration sensors 110 and deformation sensors 130 are concurrently activated. Measurements of positions and deformations are concurrently recorded 610, respectively, using the calibration sensors 110 and deformation sensors 130. In one embodiment, once calibration sensors 110 and deformation sensors 130 are turned on (e.g., powered on) and instructed to measure corresponding positions and deformations. In some embodiments, the calibration sensors 110 and deformation sensors 130 are already powered on and are instructed to measure corresponding positions and deformations.

A kinematic model (transfer function) is generated 620 to map the positions and deformations obtained during the calibration phase. The kinematic model is inverted 630, to obtain an inverse kinematic model (or inverse transfer function).

At run time, calibration sensors 110 are deactivated and deformation sensors 130 are activated 640. In some embodiments, calibration sensors 110 are turned off and deformation sensors 130 are turned on. In some embodiments, calibration sensors 110 may not be turned off and may remain powered on, but the calibration sensors would not be instructed to take any measurements. Deformation signals are measured 650 from the deformation sensors 130 in response to hand manipulation. Positions (and optionally orientations) of hand parts are computed 660 by applying the inverse kinematic model to the measured deformation signals.

The relative positions of portions of the wearable device are used to determine orientations of portions of the wearable device. For example, spatial separation between parts of a finger (determined based on the position vectors) is used to compute an angular separation (e.g., planar angle as illustrated in FIG. 2, or transverse/oblique angle as illustrated in FIG. 3) between fingers, or to determine a bend angle of an individual finger (as illustrated in FIG. 4).

In one or more embodiments, the disclosed approaches (e.g., the systems and methods for position and orientation sensing (e.g., sensing bend angles and angular separations) are used in conjunction with a virtual reality (VR) system. For example, the disclosed approaches for detecting bend angles and angular separation of fingers or other body parts are used to provide information about or to render a state of the hand (or other body part) in a VR environment or VR world. For example, states of a hand (e.g., open, closed, pointing, gesturing, etc.) can be determined based on the detected orientations of fingers of the hand.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Additional Configuration Information

The figures depict various embodiments of the present invention for purposes of illustration only. One skilled in the art will readily recognize from the following discussion that alternative embodiments of the structures and methods illustrated herein may be employed without departing from the principles of the invention described herein.

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Some embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Some embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, of the scope of the embodiments, which is set forth in the following claims.

What is claimed is:

1. A wearable device comprising:
one or more deformation sensors coupled to a deformable material that is configured to be worn on a body part of a user, the one or more deformation sensors configured to measure one or more deformation signals associated with movement of a portion of the body part;
one or more calibration sensors coupled to the deformable material, the one or more calibration sensors configured to measure position of a same or corresponding body part, the one or more calibration sensors being a different type of sensor than a type of the one or more deformation sensors; and
a controller configured to:
generate a kinematic model using a first set of pre-calibration measurements from the one or more calibration sensors and a second set of pre-calibration measurements from the one or more deformation sensors, each pre-calibration measurement in the first set of pre-calibration measurements from the one or more calibration sensors is mapped to a corresponding pre-calibration measurement in the second set of pre-calibration measurements from the one or more deformation sensors; and
determine a position of the body part based on the measured one or more deformation signals and an inverse kinematic model that maps deformation signals to positions of a same or corresponding body part, wherein the inverse kinematic model is an inverse of the kinematic model.

2. The wearable device of claim 1, wherein the kinematic model maps positions of the same or corresponding body part to deformation signals.

3. The wearable device of claim 1, wherein each of the one or more calibration sensors comprise a magnetic field generator and a magnetic flux sensor.

4. The wearable device of claim 3, wherein the magnetic field generator includes one or more magnets and the magnetic flux sensor includes one or more corresponding sensing elements, each magnet is configured to generate a magnetic field along a corresponding axis, and each corresponding sensing element is configured to generate a signal proportional to and responsive to the magnetic field along a different corresponding axis.

5. The wearable device of claim 4, wherein each corresponding axis is orthogonal to another corresponding axis and each different corresponding axis is orthogonal to another different corresponding axis.

6. The wearable device of claim 4, wherein each magnetic field is uniquely distinguished from magnetic fields generated by other magnetic generators.

7. The wearable device of claim 6, wherein each magnetic field is driven at a different frequency.

8. The wearable device of claim 6, wherein each magnetic field is driven at a different time.

9. The wearable device of claim 1, further comprising:
one or more stimulators that are coupled to the deformable material and are configured to stimulate a body part in a vicinity of a corresponding deformation sensor, wherein the one or more calibration sensors are configured to be activated concurrent with the one or more stimulators, and wherein the corresponding deformation sensor is configured to measure a response to a stimulation of the body part from the one or more stimulators.

10. The wearable device of claim 1, wherein the wearable device is a glove and the body part is a hand.

11. A method comprising:
activating one or more deformation sensors coupled to a deformable material of a wearable device that is configured to be worn on a body part of a user;
activating one or more calibration sensors coupled to the deformable material, the one or more calibration sensors configured to measure position of a same or corresponding body part, the one or more calibration sensors being a different type of sensor than a type of the one or more deformation sensors;
measuring deformation signals from the one or more deformation sensors associated with movement of a portion of the body part;
generating a kinematic model using a first set of pre-calibration measurements from the one or more calibration sensors and a second set of pre-calibration measurements from the one or more deformation sensors, each pre-calibration measurement in the first set of pre-calibration measurements from the one or more calibration sensors is mapped to a corresponding pre-calibration measurement in the second set of pre-calibration measurements from the one or more deformation sensors; and
computing positions of the body part by applying an inverse kinematic model to the measured deformation signals, wherein the inverse kinematic model is an inverse of the kinematic model.

12. The method of claim 11, wherein the generated the kinematic model maps positions of the same or corresponding body part to corresponding deformation signals.

13. The method of claim 11, wherein each of the one or more calibration sensors comprise a magnetic field generator and a magnetic flux sensor.

14. The method of claim 13, wherein the magnetic field generator includes one or more magnets and the magnetic flux sensor includes one or more corresponding sensing elements, each magnet is configured to generate a magnetic field along a corresponding axis, and each corresponding sensing element is configured to generate a signal proportional to and responsive to the magnetic field along a different corresponding axis.

15. The method of claim 14, wherein each corresponding axis is orthogonal to another corresponding axis and each different corresponding axis is orthogonal to another different corresponding axis.

16. The method of claim 14, wherein each magnetic field is uniquely distinguished from magnetic fields generated by other magnetic generators.

17. The method of claim 16, wherein each magnetic field is driven at a different frequency.

18. The method of claim 16, wherein each magnetic field is driven at a different time.

19. The method of claim 11 further comprising:
concurrently activating one or more stimulators, that are coupled to the deformable material, to apply a stimulus to the body part, the one or more calibration sensors for measuring position of a same or corresponding body part, and the one or more deformation sensors to measure corresponding deformation signals in conjunction with the applied stimulus.

20. The method of claim 11, wherein the wearable device is a glove and the body part is a hand.

21. The wearable device of claim 1, wherein the inverse kinematic model is a sparse matrix of one or more moment arm functions that map the measured one or more deformation signals to determine the positions of the same or corresponding body part.

* * * * *